US012670137B1

(12) United States Patent
Jagarapu et al.

(10) Patent No.: US 12,670,137 B1
(45) Date of Patent: Jun. 30, 2026

(54) SYSTEMS AND METHODS FOR A GEOSPATIAL LOCATION DATA ARCHITECTURE

(71) Applicant: Veeva Systems Inc., Pleasanton, CA (US)

(72) Inventors: Ravi Teja Jagarapu, Cliffwood, NJ (US); Thomas Settefrati, North Wales, PA (US); Vinodh Kumar Ramachandran, Livingston, NJ (US); Jacob Celestine, Flemington, NJ (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/314,511

(22) Filed: Aug. 29, 2025

(51) Int. Cl.
| | |
|---|---|
| *G06F 16/20* | (2019.01) |
| *G06F 7/14* | (2006.01) |
| *G06F 16/215* | (2019.01) |
| *G06F 16/29* | (2019.01) |
| *G06F 16/9537* | (2019.01) |

(52) U.S. Cl.
CPC .............. *G06F 16/215* (2019.01); *G06F 7/14* (2013.01); *G06F 16/29* (2019.01); *G06F 16/9537* (2019.01)

(58) Field of Classification Search
CPC .......... G06F 16/215; G06F 7/14; G06F 16/29; G06F 16/9537
See application file for complete search history.

(56) References Cited

U.S. PATENT DOCUMENTS 6,985,926 B1 * 1/2006 Ferlauto ................ G06F 16/215
707/999.01

| | | | | |
|---|---|---|---|---|
| 8,996,523 | B1 * | 3/2015 | Fisher ..................... | G06F 16/29 707/919 |
| 2003/0046280 | A1 | 3/2003 | Rotter et al. | |
| 2004/0040898 | A1 * | 3/2004 | Kechel ...................... | B07C 3/00 209/584 |
| 2008/0077573 | A1 | 3/2008 | Weinberg et al. | |
| 2016/0321314 | A1 * | 11/2016 | Reich .................... | G06F 40/166 |
| 2021/0081463 | A1 * | 3/2021 | Walker ................. | G06F 16/958 |
| 2023/0161976 | A1 * | 5/2023 | Sazonova .............. | G06N 5/025 704/2 |

OTHER PUBLICATIONS

Address Cleansing, by Veeva, dated May 28, 2004, available at https://web.archive.org/web/20240528072628/https://docs-vdm. veevanetwork.com/doc/vndocad/Content/Network_topics/Inbox/ Address_cleansing.htm (Year: 2024).*

* cited by examiner

*Primary Examiner* — Mahesh H Dwivedi

(57) ABSTRACT

A method for generating location data including receiving and outputting first location data. The method further includes receiving a response and validating the first piece of location data based on the response. The method further includes cleaning the first location data. The method further includes querying a first repository to select second location data and a third location data. The method further includes assigning the cleaned first location data a first rank, the second location data a second rank, and the third location data a third rank. The method further includes merging the cleaned first location data and the second piece of location data to generate first merged location data. The method further includes merging the first merged location data and the third location data to generate second merged location data. The method further includes storing the second merged location data in the first repository.

17 Claims, 7 Drawing Sheets

300

302

306

301

303

304

305

120a

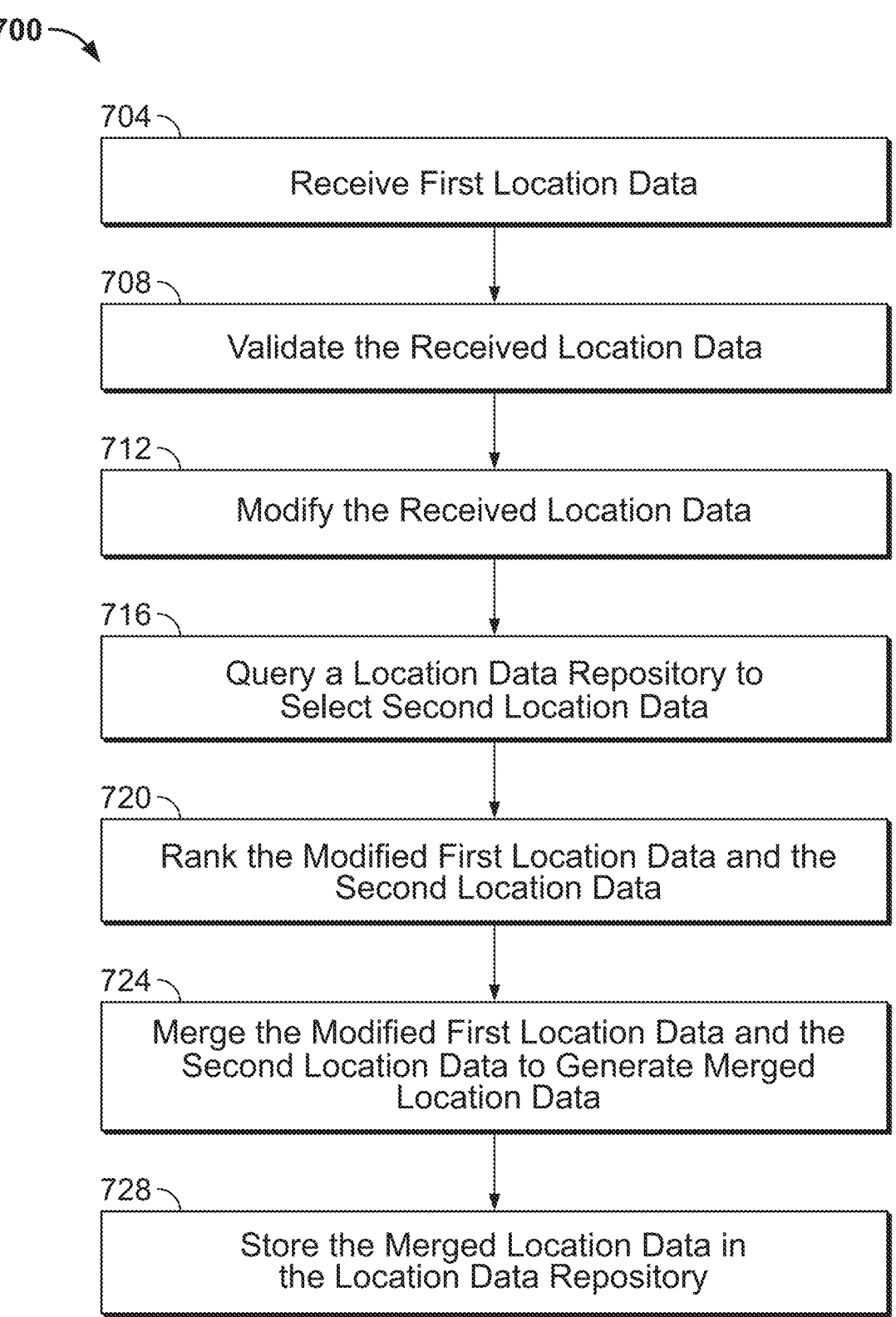

700

704 — Receive First Location Data

708 — Validate the Received Location Data

712 — Modify the Received Location Data

716 — Query a Location Data Repository to Select Second Location Data

720 — Rank the Modified First Location Data and the Second Location Data

724 — Merge the Modified First Location Data and the Second Location Data to Generate Merged Location Data 728 — Store the Merged Location Data in the Location Data Repository

FIG. 7

SYSTEMS AND METHODS FOR A GEOSPATIAL LOCATION DATA ARCHITECTURE

TECHNICAL FIELD

The present disclosure relates to systems and methods for a geospatial location data architecture.

BACKGROUND

Researchers, scientists, industry players, technologists, government regulators, and other stakeholders are increasingly in need of efficient and simple ways to receive, generate, and process geospatial location data.

SUMMARY

One embodiment relates to method for generating location data. The method includes receiving and outputting first location data. The method further includes receiving, in response to outputting the first location data, a response and validating the first piece of location data based on the response. The method further includes cleaning, in response to validating the first location data, the first location data. The method further includes querying a first repository to select second location data and third location data. The method further includes assigning the cleaned first location data a first rank, the second location data a second rank, and the third location data a third rank. The method further includes merging, based on the first rank and the second rank, the cleaned first location data and the second piece of location data to generate first merged location data. The method further includes merging, based on the third rank, the first merged location data and the third location data to generate second merged location data. The method further includes storing the second merged location data in the first repository.

Another embodiment relates to method for generating location data. The method includes receiving first location data including an address field. The method further includes determining the address field includes an address including a street address value, a locality value, and a country value. The method further includes validating the first location data in response to determining the address of the address field includes the street address value, the locality value, and the country value. The method further includes cleaning, in response to validating the first location data, the first location data. The method further includes querying a first repository to select second location data and third location data. The method further includes assigning the cleaned first location data a first rank, the second location data a second rank, and the third location data a third rank. The method further includes merging, based on the first rank and the second rank, the cleaned first location data and the second location data to generate first merged location data. The method further includes merging, based on the third rank, the first merged location data and the third location data to generate second merged location data. The method further includes storing the second merged location data in the first repository.

Another embodiment relates to method for generating location data. The method includes receiving and outputting first location data. The method further includes receiving, in response to outputting the first location data, a response and validating the first location data based on the response. The method further includes cleaning, in response to validating the first location data, the first location data. The method further includes querying a first repository to select second location data and third location data. The method further includes assigning the cleaned first location data a first rank, the second location data a second rank, and the third location data a third rank. The method further includes merging, based on the third rank and the second rank, the second location data and the third location data to generate first merged location data. The method further includes merging, based on the first rank, the first merged location data and the cleaned first location data to generate second merged location data. The method further includes storing the second merged location data in the first repository.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 7 is a flow diagram of a method for generating and storing merged geospatial location data, according to an example embodiment.

DETAILED DESCRIPTION

Referring generally to the figures, systems and methods for a geospatial location data architecture are disclosed. The systems and methods described herein provide for improved geospatial location data storage systems and pipelines. For instance, without validating the location data, databases and pipelines are susceptible to errors including human entry errors (e.g., typos in addresses ("123 Main Stret"), incorrect postal codes, or missing information), device errors (e.g., a mobile device's GPS may report a location with low accuracy due to poor satellite reception), malformed data, and data outliers, which when directly added to a location repository provide for low-quality location data. In comparison, the present systems and methods incorporate a validation layer and step, which prevents bad data from entering the system and provide for improved data accuracy and reliability as well as data standardization. For instance, by validating the location data, the present systems and methods identify and discard data points that are clearly erroneous or duplicative and ensure consistency across the location dataset. This saves on memory by storing less data overall (e.g., by not storing the bad addresses or location data) and provides for faster processing. For instance, a clean, standardized dataset is easier for databases to index and for analytical tools to process. Queries run faster and more efficiently because they don't have to deal with noisy, unusable data.

Additionally, by cleaning and augmenting received location data, the present systems and methods provide for a technical improvement to location data pipelines and extract, transform, and load (ETL) systems by providing for consistent and clean data and improved location data granularity. For instance, by cleaning the location data such that it matches or fits the location data schema, the present systems and methods ensures that all incoming location data conforms to a specific location data schema, which is a predefined structure for how data should be formatted, thereby eliminating the inconsistencies that often cause errors in downstream applications and systems, and providing a more robust and reliable foundation for any system that uses location data. Likewise, by augmenting the received location data, the present systems and methods provide for improved and more accurate location data overall, and allows for more sophisticated and precise analysis. For example, a logistics company can use 9-digit zip codes to optimize delivery routes more effectively, and a marketing team can use demographic data tied to specific locations to create more targeted campaigns.

Figure 1:
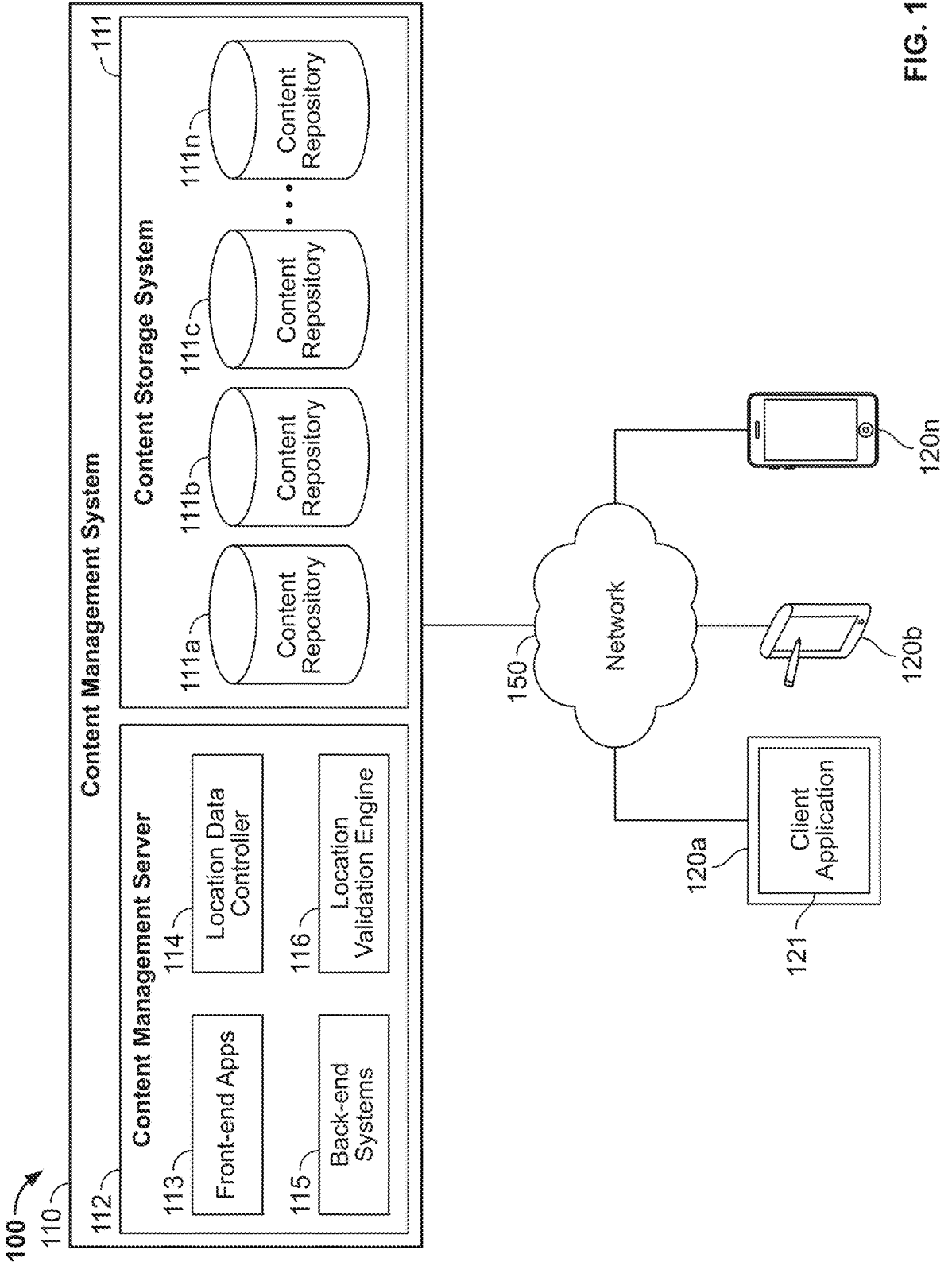
FIG. 1 illustrates an example high level block diagram of an enterprise content management architecture, according to an example embodiment.

Referring now to FIG. 1 an enterprise content management system 100 is shown, according to an example embodiment. The enterprise may be a business, an organization, or the like. As shown, the system 100 includes a content management system 110, and a plurality of client computing devices 120a, 120b, . . . 120n, coupled to each other via a network 150. The content management system 110 includes a content storage system 111 and a content management server 112. The content storage system 111 includes multiple content repositories, e.g., 111a, 111b, 111c . . . and 111n.

The network 150 communicably and operably couples the content management system 110 and the client computing devices 120a-120n such that communicable and operable computing may be provided between the content management system 110 and the client computing devices 120a-120n over the network 150. In various embodiments, the network 150 includes any combination of a local area network (LAN), an intranet, the Internet, or any other suitable communications network, directly or through another interface.

The client computing devices 120a-120n may be any machine or system that is used by a user to access the content management system 110 via the network 150, such as any commercially available computing devices including laptop computers, desktop computers, mobile phones, smart phones, tablet computers, netbooks, and personal digital assistants (PDAs). A client application 121 runs from a client computing device, e.g., the client computing device 120a, and accesses content in the content management system 110 via the network 150. In some embodiments, each client computing device 120a-120n includes a network interface (not shown to communicate with the network) and a processing circuit (not shown) to process data (e.g., data records, change data records). The client computing devices 120a-120n are illustrated in more detail in FIG. 4.

The content storage system 111 stores content that client applications (e.g., 121) in client computing devices 120a-120n may access and may be any commercially available storage devices. Each content repository (e.g., 111a, 111b, 111c or 111n) stores content, such as data records associated with the client applications (e.g., 121). In one example, the content storage system 111 may store data records (e.g., sales data records, etc.) associated with a customer relationship management (CRM) application. Data records may be stored in the content repositories 111a-111n, but each tenant's data may be segregated from other tenants' data in the content storage system 111 by being stored in a separate content repository. In some embodiments, each content repository 111a-111n may include multiple additional repositories (not shown). In this regard, each content repository 111a-111n may be a group or set of repositories associated with a specific customer or tenant.

The content management server 112 is a remote computer system accessible over a remote or local network, such as the network 150. In this regard, the content management server 112 could be any commercially available computing devices. A client application (e.g., 121) process may be active on one or more client computing devices 120a-120n. The corresponding server process may be active on the content management server 112, as one of the front-end applications 113 described with reference to FIG. 2. The client application process and the corresponding server process communicate with each other over the network 150, thus providing distributed functionality and allowing multiple client applications to take advantage of the information-gathering capabilities of the content management system 110.

In some embodiments, the content management server 112 may include a location data controller 114 which may receive, clean, verify, and modify location data, and then store the location data in a repository for use with the front-end applications 113, as will be described further herein. For instance, the location data controller 114 may maintain verified and updated location data in the repository, which may be used by front-end applications 113 to generate and process data records.

Additionally, the content management server 112 may include location validation engine 116. The location validation engine 116 may receive location data (e.g., from the location data controller 114) and validate the location data as a valid location. In some embodiments, the location validation engine 116 may output the location data via an application programming interface (API) to validate the location data, as will be described further herein.

Although the front-end applications 113, the back-end systems 115, the location data controller 114, and the location validation engine 116, are shown in one server, it should be understood that they may be implemented in multiple computing devices (e.g., multiple servers for each, a single server for the for each front-end application 113, a single server for each back-end system 115, a server for the location data controller, etc.).

In some embodiments, the content management system 110 is a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
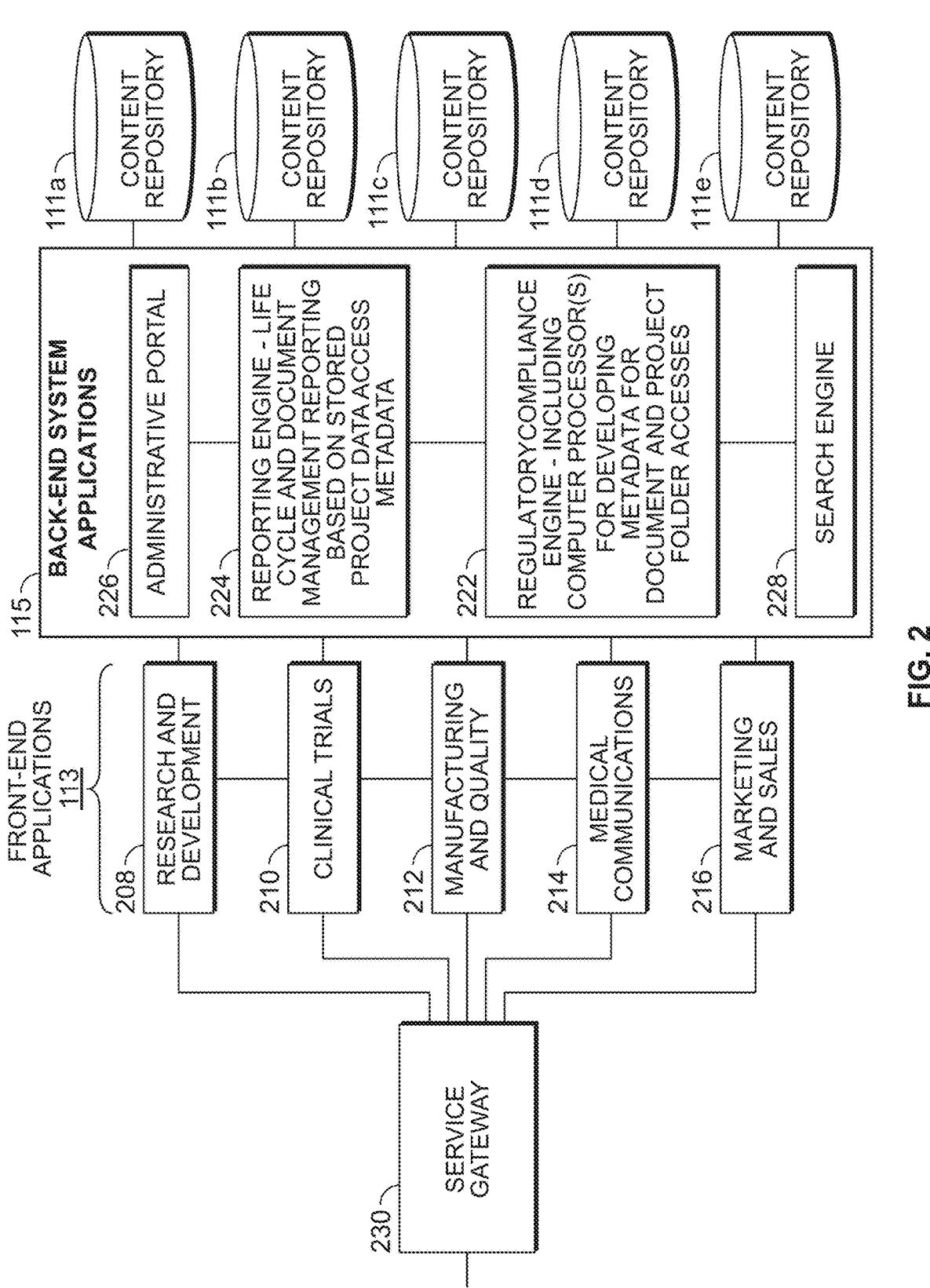
FIG. 2 provides a description of the content management system with additional specific applications and interfaces connected thereto, according to an example embodiment.

FIG. 2 provides a description of the content storage system 111 with additional specific applications and interfaces connected thereto, according to an example embodiment. In some embodiments, the content storage system 111 is a cloud-based or distributed network-based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in FIG. 2, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111*a*. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process are managed and stored in the content management system 110, or more specifically, the content repository 111*c*, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111*d*.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111*e*.

Still referring to FIG. 2, a number of back-end system applications 115 provide for the management of the data, forms, and other communications in the content management system 110. For example, the back-end systems applications 115 include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata for document and project folder accesses so from a regulatory compliance standpoint it can be assured that only allowed accesses are permitted. The regulatory compliance engine 222 may further includes prevalidation functionality to build controlled content in support of installation qualification (IQ) and/or operational qualification (OQ), resulting in significant savings to customers for their system validation costs.

In some embodiments, the back-end systems 115 include a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In some embodiments, the back-end systems 115 include an administrative portal 226 whereby administrators can control documents, properties, users, security, workflow and reporting with a simple, point-and-click web interface. Customers also have the ability to quickly change and extend the applications or create brand new applications, including without writing additional software code.

In some embodiments, the back-end systems 115 include a search engine 228 whereby the content management system 110 can deliver simple, relevant and secure searching.

In some embodiments, the content management system 110 may include more back-end systems (not shown). These additional back-end systems may perform operations that assist with back-end operations, such as a rules engine to determine and execute data record rules, a security engine to perform data security operations, and the like.

In providing this holistic combination of front-end applications 113 and back-end systems 115, the various applications can further be coordinated and communicated with by the service gateway 230, which in turn provides for communications with various web servers and/or web services APIs. Such web servers and/or web services APIs can include access to the content and metadata layers of some or all of the various front-end applications 113 and back-end systems 115, enabling seamless integration among complementary systems.

In the context of the described embodiments, content in one repository, e.g., the content repository 111*a* for the Research & Development (R&D) front-end application 208, may be re-used in another repository (e.g., the content repository 111*d*) with another front-end application (e.g., the medical communications application 214).

As described herein, the content management system 110 may store information relating to the life sciences industry. In other embodiments, the content management system 110 may store content for other industries.

Figure 3:
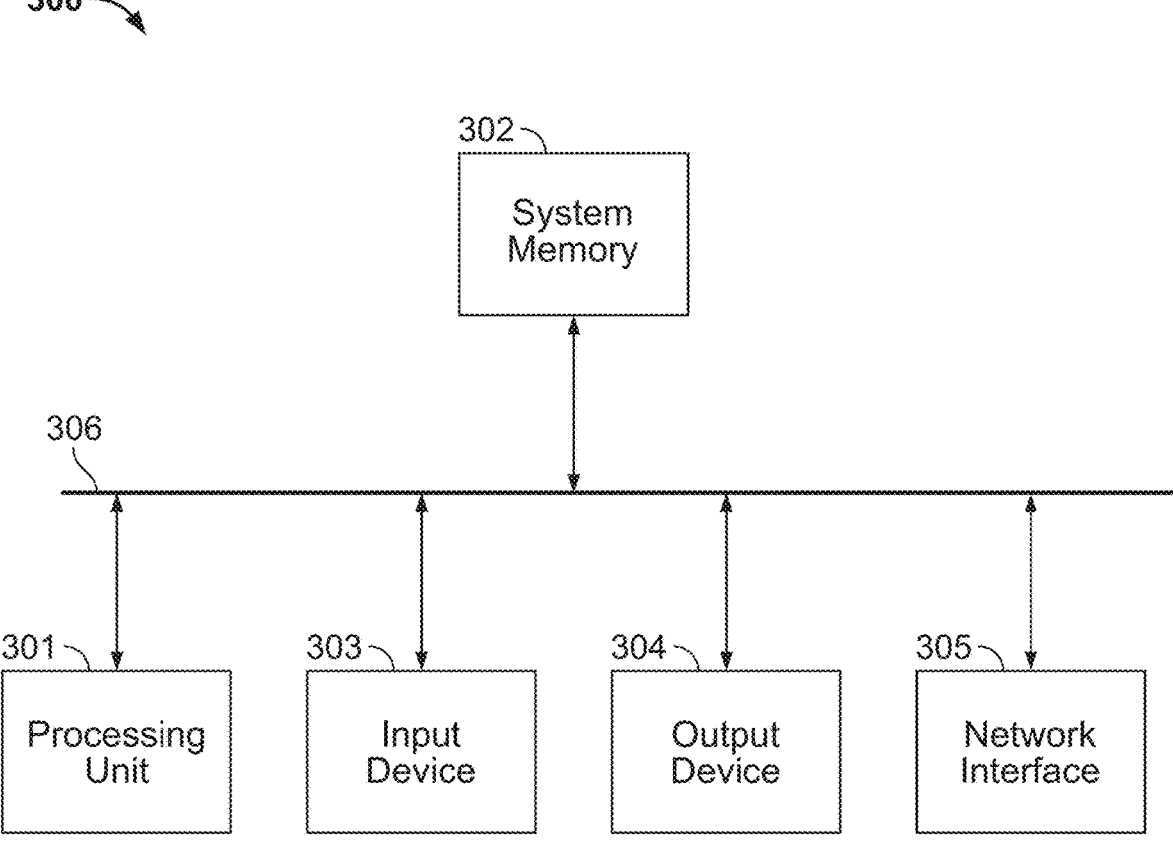
FIG. 3 shows an example block diagram of a computing device, according to an example embodiment.

FIG. 3 illustrates an example block diagram of a computing device 300 which can be used as the client computing devices 120*a*-120*n*, and the content management server 112 in FIG. 1, according to an example embodiment. The computing device 300 is an example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 is configured to execute computer instructions that are stored in a computer-readable medium, for example, the system memory 302. In some embodiments, the processing unit 301 may be implemented as a general-purpose processor, an application specific integrated circuit (ASIC), one or more field programmable gate array (FPGAs), a digital signal processor (DSP), a group of processing components or other suitable electronic processing components.

The system memory 302 includes a variety of computer readable media which may be any available media accessible by the processing unit 301. For instance, the system memory 302 may include one or more memory devices (e.g., RAM, NVRAM, ROM, flash memory, hard disk storage, etc.) that store data and/or computer code for facilitating the various processes described herein. That is, in operation and use, the system memory 302 stores at least portions of instructions and data for execution by the processing unit 301. The system memory 302 may be or include tangible, non-transient volatile memory and/or non-volatile memory.

A user can enter commands and information to the computing device 300 through the input device 303. The input device 303 may be, e.g., a keyboard, a touchscreen input device, a touch pad, a mouse, a radio-frequency identifier (RFID) scanner, a sensor, a microphone, and/or a pen.

The computing device 300 provides its output via the output device 304 which may be a monitor or other type of display device, an RFID scanner, a sensor, a speaker, or a printer.

The computing device 300, through the network interface 305, operates in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 include program logic and/or hardware-based components that connect the computing device 300 to the network 150. For example, the network interface 305 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 305 includes the hardware and machine-readable media configured to support communication over multiple channels of data communication (e.g., wireless, Bluetooth®, near-field communication (NFC). In some embodiments, the network interface 305 includes cryptography logic and capabilities to establish a secure communications session.

Figure 4:
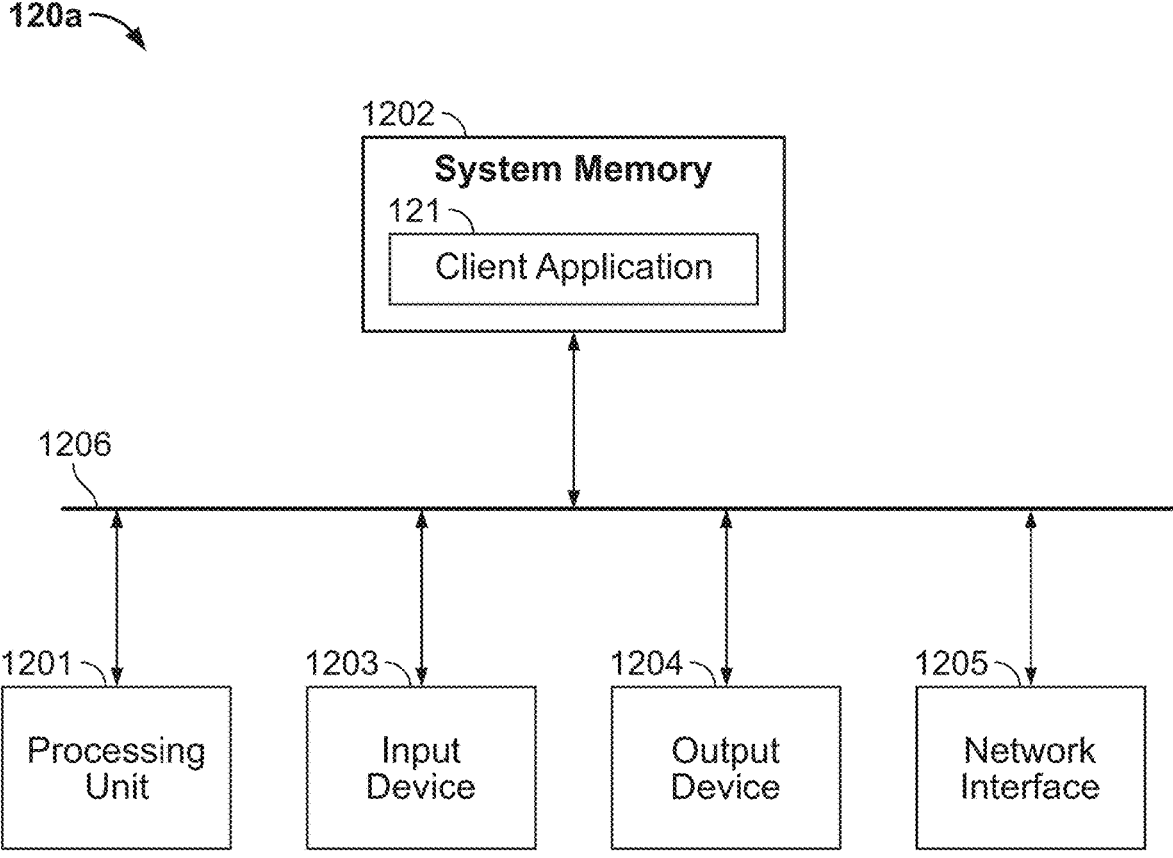
FIG. 4 illustrates an example high level block diagram of a client computing device, according to an example embodiment.

FIG. 4 illustrates a high level block diagram of a client computing device (e.g., 120*a*), according to an example embodiment. The client computing device 120*a* may be implemented by the computing device 300 described above, and includes processing unit 1201, a system memory 1202, an input device 1203, an output device 1204, and a network interface 1205, coupled to each other via a system bus 1206. The system memory 1202 may store the client application 121.

Figure 5:
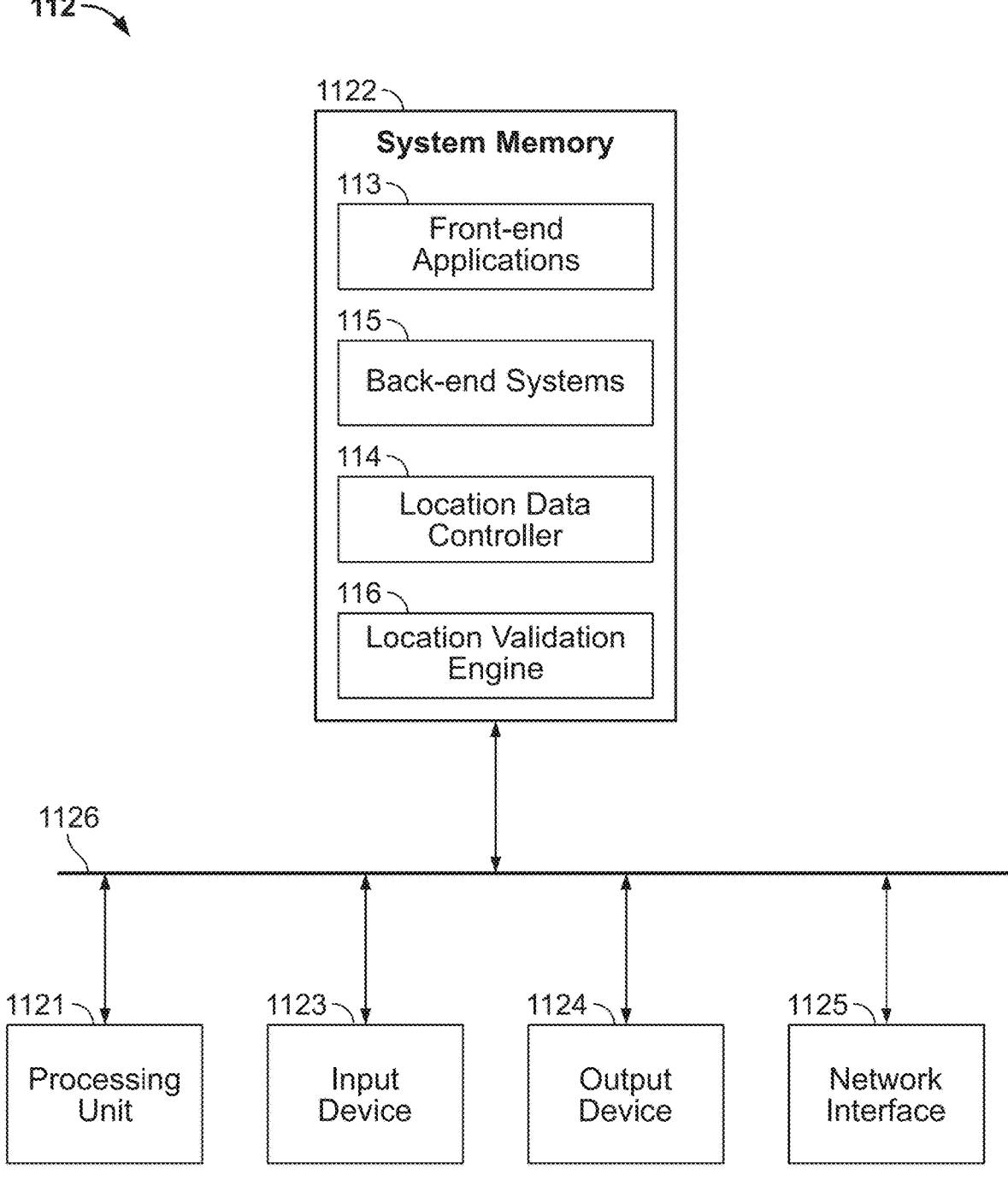
FIG. 5 depicts an example high level block diagram of the content management server, according to an example embodiment.

FIG. 5 illustrates a high-level block diagram of the content management server 112, according to an example embodiment. The content management server 112 may be implemented by the computing device 300, and includes a processing unit 1121, a system memory 1122, an input device 1123, an output device 1124, and a network interface 1125, coupled to each other via a system bus 1126. The system memory 1122 stores the front-end applications 113, the back-end systems 115, the location data controller 114, and the location validation engine 116.

Figure 6:
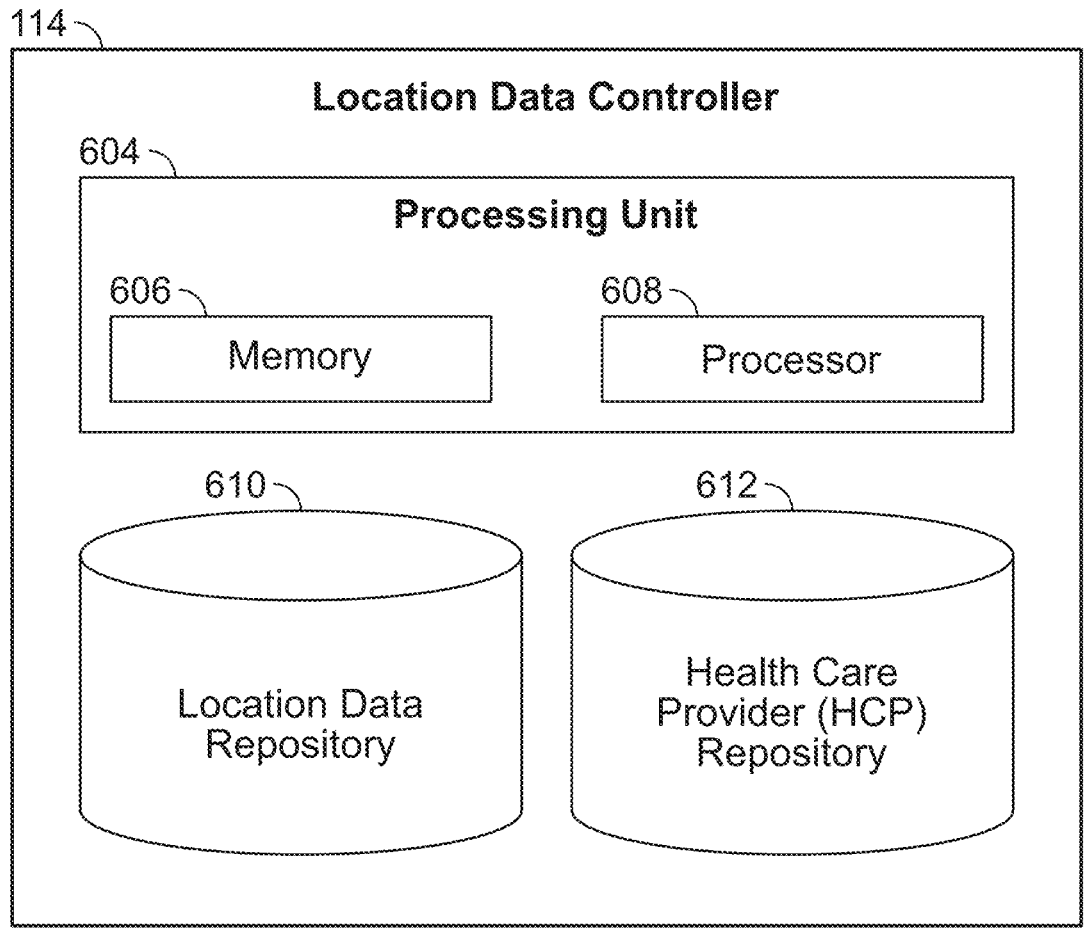
FIG. 6 depicts an example high level block diagram of the location data controller according to an example embodiment.

FIG. 6 illustrates an example high level system diagram of the location validation controller 114, according to an example embodiment. As described herein, the location validation controller may be a stand-alone computing device (as compared to a shared computing resource as discussed with regard to FIG. 1) such as a server computing device. As shown, the location validation controller 114 may include a processing unit 604, a first repository 610 (e.g., a location data repository 610), and a second repository 612 (e.g., a drug enforcement address repository, a health care provider (HCP) repository, etc.).

The processing unit 604, as shown, may be similar to the processing units 301 and 1201 and comprises a memory 606 and a processor 608. The memory 606 includes one or more memory devices (e.g., RAM, NVRAM, ROM, flash memory, hard disk storage, etc.) that store data and/or computer code for facilitating the various processes described herein. That is, in operation and use, the memory 606 stores at least portions of instructions and data for execution by the processor 608 to control the processing unit 604. The memory 606 may be or include tangible, non-transient volatile memory and/or non-volatile memory. The processor 608 may be implemented as a general-purpose processor, an application specific integrated circuit (ASIC), one or more field programmable gate array (FPGAs), a digital signal processor (DSP), a group of processing components, or other suitable electronic processing components.

The location data repository 610 is a repository (e.g., a database) that is structured or configured to receive, store, and manage location data (e.g., pieces or sets of location data) validated and modified by the location validation controller 114. In some embodiments, each piece or set of location data may be associated with a specific health care entity (e.g., a health care provider (HCP) or health care organization (HCO)). Accordingly, the location data repository 610 may store the location data in association with the health care entity, and then provide for searching or querying based on the health care organization. For instance, the location data repository 610 may receive a request for location data associated with a specific health care entity and return the matching location data, in response.

The location data repository 610 can be structured according to various database types, such as, relational, hierarchical, network, flat, point-in time, and/or object relational. Likewise, the location data repository 610 may include a plurality of nonvolatile/non-transitory storage media such as solid-state storage media, hard disk storage media, virtual storage media, cloud-based storage drives, storage servers, and/or the like.

Similarly, the health care provider (HCP) 612 is a repository (e.g., a database) that is structured or configured to receive, store, and data pertaining medical products and associated data such as metadata. For example, the HCP repository 612 may receive drug enforcement agency (DEA) HCP data that includes a specific identifies specific HCPs and their addresses. In some embodiments, the HCP data may include an HCP identifier (e.g., national provider identifier (NPI), a name of the HCP, etc.), an address of the HCP, and the like. The HCP repository 612 can be structured according to various database types, such as, relational, hierarchical, network, flat, point-in time, and/or object relational. Likewise, the HCP repository 612 may include a plurality of nonvolatile/non-transitory storage media such as solid-state storage media, hard disk storage media, virtual storage media, cloud-based storage drives, storage servers, and/or the like.

Referring now to FIG. 7, a method 700 of generating and storing geospatial location data is shown, according to an example embodiment. Method 700 can be carried out by the system of FIG. 1. More particularly, the method 700 can be carried out by the content management server 112.

Method 700 commences at step 704 at which the content management server 112 receives first location data. In some embodiments, the first location data is received from one of the client computing devices (e.g., 120a). In other embodiments, the first location data is received from an external location data repository or computing device (not shown). The location data may be associated with a specific health care entity (e.g., an HCP, an HCO, an identifier associated with the health care entity (e.g., a national provider identifier (NPI))) and include geographic or geospatial value. Fo instance, the location data may include vector data, raster data, global position system (GPS) data, cell tower data, address data, property data, and the like. For example, the location data may include GPS geospatial data that includes a latitude value, a longitude value, and an altitude value. In another example, the location data may include address geospatial data that includes a street address line or value (e.g., a house number, a Post Office (PO) box number, a street name, a street type (e.g., Avenue, Street, Lane, etc.), a direction (e.g., North Mill St), a secondary address designator (e.g., apartment number, suite number, unit number, etc.), and the like), a locality line or value (e.g., a city, town, a locality, a state, a province, a region, a postal code, a zip code, etc.), and a country line or value.

In some embodiments, at step 704, the content management server 112 may receive multiple pieces or sets of location data (e.g., a first piece of location data, a second piece of location data, a third piece of location data, etc.). The content management server 112 may then proceed through the method 700 for each piece of location data. In some embodiments, each of the pieces of location data may be associated with the same health care entity (e.g., the same NPI). In other embodiments, each of the pieces of location data may be associated with a different health care entity.

Once the content management system 112 has received the first location data, the method 700 proceeds to step 708 at which the content management system 112 validates the received location data. In some embodiments, at step 708, the content management system 112 outputs the received location data to a location data verification computing device or system. For instance, the content management system 112 may output the location data, via an API, to the location data verification computing system (e.g., an API gateway or server) associated with a location verification service (e.g., Loqate®, Melissa, Smarty, Experian Address Validation Service, Google maps, etc.). Loqate® is a location intelligence specialist that provides a suite of services to help businesses capture, verify, and maintain high-quality customer location data globally. Accordingly, at step 708, the content management system 112 may output the received location data to the location data verification computing system associated with a location verification service, such as Loqate®. Then, in response, the content management system 112 may receive a response indicating whether the location data is valid or invalid. Then, based on the response indicating the location is valid (e.g., is a valid address, is a valid set of GPS coordinates, is a valid geospatial location, etc.), the content management system 112 may validate or verify the location data.

In some embodiments, the location data may be received, at step 704, from one of the client computing devices (e.g., 120a). Accordingly, at step 708, the content management system 112 may output the location data to one of the client computing devices (e.g., 120a) for verification. For instance, the location data may be received from a first client computing device 120a. Then, at step 708, the location data may be output to the same client computing device 120a, which may verify the client computing device 120a was at or near the location identified by the location data. In one example, the client computing device (e.g., 120a) may include locations services that output location data associated with the client computing device (e.g., 120a). Accordingly, when the client computing device (e.g., 120a) receives the location data at step 708, the client computing device 108 may verify the location data based on the client computing device (e.g., 120a) having been at or near the location of the location data.

Accordingly, in response to verifying the location data, the client computing device (e.g., 120a) may output an indication the location data is verified, and the content management system 112 may verify the location data in response. Likewise, in response to not verifying the location data, the client computing device (e.g., 120a) may output an indication the location data is not verified, and the content management system 112 may not verify the location data in response.

In other embodiments, the content management system 112 may validate the location data by determining the location data is in the correct format and includes the correct amount of data for the specific address. For instance, the content management system 112 may first determine if the location data includes a street address line or value, a locality line or value, and a country line or value. If the location data is missing any of these values, the content management system 112 may determine the location data is not properly formatted and not validate the location data. In comparison, if the location data is properly formatted, the content management system 112 may query a location database or repository (e.g., the location data repository 610, an external location data repository (e.g., the United States Postal Service Address Information System (AIS) repository (not shown), royal mail postcode address repository (not shown), or the like), etc.) and determine if the repository includes a matching address. Then, in response to the location database or repository including a match or a substantial match (e.g., almost all portions of the location data matching, a fuzzy match, etc.), the content management system 112 may validate the location data.

In some embodiments, the content management system 112 may determine a confidence score associated with and based on the location data. Then, in response to the confidence score being greater than a specific threshold percentage (e.g., 75%, 80%, 85%, 90%, 95%, 98%, 99%, etc.), the content management system 112 may validate the location data. In comparison, in response to the confidence score being less than the threshold percentage, the content management system 112 may not validate the location data. For instance, the content management system 112 may use a location validation model to estimate the accuracy and validity of the location data. While not shown, the location validation model may be a machine-learning model that utilizes the location data and other features such as a location data of the location data repository 510, HCP data of the HCP repository 612, and the like. Likewise, the location validation model may output a confidence score associated with the location data, which may be used by the content management system 112 to validate the location data.

In some embodiments, the content management system 112 may output the location data, as a part of a request to an artificial intelligence (AI) computing system (not shown). The artificial intelligence computing system may be associated with an AI provider (e.g., Google Gemini®, OpenAI®, Anthropic Claud®, etc.) and use an AI model (e.g., a large language model (LLM), a neural network model, etc.) to validate the location data. Accordingly, at step 708, the content management system 112 may output the location data to an API of the AI provider. For instance, the content management system 112 may generate a request including the location data, a text query (e.g., a prompt), and an API key. The request may be output to an API gateway or server of the AI provider, and the content management system 112 may receive a response indicating if the location data is verified or not. In some embodiments, the response may include a link or uniform resource locator (URL) that further verifies the location data.

By validating the received location data prior to processing and storing the location data, the present systems and methods provide an improvement to geospatial location data storage systems and pipelines. For instance, without validating the location data, databases and pipelines are susceptible to errors including human entry errors (e.g., typos in addresses ("123 Main Stret"), incorrect postal codes, or missing information), device errors (e.g., a mobile device's GPS may report a location with low accuracy due to poor satellite reception), malformed data, and data outliers, which when directly added to a location repository provide for low-quality location data. Accordingly, by adding a validating layer and step, the present systems and methods prevents bad data from entering the system and provide for improved data accuracy and reliability as well as data standardization. For instance, by validating the location data, the present systems and methods identify and discard data points that are clearly erroneous or duplicative and ensure consistency across the location dataset. This saves on memory by storing less data overall (e.g., by not storing the bad addresses or location data) and provides for faster processing. For instance, a clean, standardized dataset is easier for databases to index and for analytical tools to process. Queries run faster and more efficiently because they don't have to deal with noisy, unusable data.

Once the content management server 112 has validated the received location data, the method 700 proceeds to step 712 at which the content management server 112 modifies the received location data. For instance, the content management server 112 may modify the received location data to normalize or clean and augment the location data. In some embodiments, the content management server 112 may clean the location data by removing portions of the location data to fit a location data schema. For instance, the received location data may include fields or values which are superfluous and generally not required for any specific location data purpose (e.g., external system identifiers, checksums, redundant information (e.g., first name and first initial), and the like. Accordingly, the content management server 112 may clean the location data by removing the excess portions to fit or match the location data schema. In another example, the content management server 112 may standardize street names (e.g., "St." vs. "Street," "Ln" to "Lane," etc.). In another example, the content management server 112 may clean the location data by removing data fields that are empty (e.g., " ") or to replace specific characters or values with other characters or values.

In another example, the content management server 112 may clean or standardize the location data to match data a customer relationship management (CRM) application data set. For instance, the content management server 112 may standardize the zip code field or value of the location data should adhere to a specific length. In another example, the content management server 112 may a controlled vocabulary for specific fields like medical diagnoses (e.g., ICD-10 codes) or product names, instead of allowing free-text entry.

Likewise, at step 712, the content management server 112 may modify the received location data to augment the location data. In some embodiments, the content management server 112 may clean the location data and then augment the cleaned location data. In some embodiments, the content management server 112 may augment the location data to provide for improved granularity and data accuracy. For instance, the location data may include a specific 3-digit zip code. Accordingly, the content management server 112 may determine (e.g., by generating a request or searching a repository) a 5-digit zip code or a 9-digit zip code associated with the location data and augment the location data to include the determined zip code. In another example, the content management server 112 may convert addresses into precise geographical coordinates (latitude and longitude), and vice-versa. The content management server 112 may then add the coordinates to the location data. For instance, the content management server 112 may output the location data, via an API, to a third-party computing system (e.g., a locations services computing system, an API provider computing system, etc.) which may return precise geographical coordinates, the 5-digit zip code, or the 9-digit zip code, and the content management server 112 may augment the location data in response.

In further examples, the content management server 112 may augment the location data with: a last modified date (where the last modified date is null or empty for the received location data), information about the county, city, state, or even congressional district (e.g., population of the city, population of the county, number of representatives for a state, etc.); information about proximity to Points of Interest (POIs), such as by determining what a location is near (e.g., geographic features such as rivers or mountains, artificial features (e.g., schools, restaurants, etc.), or the like) and adding that data to the location data; and/or time/date data (e.g., timestamp the location data).

By cleaning and augmenting the received location data, the present systems and methods provide for a technical improvement to location data pipelines and extract, transform, and load (ETL) systems by providing for consistent and clean data and improved location data granularity. For instance, by cleaning the location data such that it matches or fits the location data schema, the present systems and methods ensures that all incoming location data conforms to a specific location data schema, which is a predefined structure for how data should be formatted, thereby eliminating the inconsistencies that often cause errors in downstream applications and systems, and providing a more robust and reliable foundation for any system that uses location data. Likewise, by augmenting the received location data, the present systems and methods provide for improved and more accurate location data overall, and allows for more sophisticated and precise analysis. For example, a logistics company can use 9-digit zip codes to optimize delivery routes more effectively, and a marketing team can use demographic data tied to specific locations to create more targeted campaigns.

Once the content management server 112 has modified the received location data, the method 700 proceeds to step 716 at which the content management server 112 queries a repository (e.g., the location data repository 610) to select or receive location data that matches the received location data. For instance, the content management server 112 may query the location data repository 610 for location data that matches or substantially match (i.e., most portions of the data matches, 90% of the data matches, 80% of the data matches, two of: the street address line or value, the locality line or value, and the country line or value match, etc.) the received piece of location data. In response, the location data repository 610 may return each matching or substantially matching location data. For instance, the location data repository 610 may return second location data and third location data, which may each match the first location data.

For example, at step 704, the content management server 112 may receive location data that includes a specific address (e.g., 123 W Main St, Juneau, WI, USA). Accordingly, the content management server 112 may query the location data repository 610 for matching location data, and the content management server 112 may return matching second location data (e.g., 123 E Main St, Juneau, WI, USA) and matching third location data (e.g., 123 West Main St, Apt. 1, Juneau, WI, USA).

Once the content management server 112 has queried the location data repository for matching location data and selected/received the matching pieces of location data, the method 700 proceeds to step 720 at which the content management server 112 ranks the location data. The content management server 112 may rank or score location data amongst one another such that they may be compared and analyzed, as will be described further herein.

To rank or score the location data, the content management server 112 may compare the fields or values of the location data and score the location data based on the results. For example, the content management server 112 may assign scores to each piece or set of location data based on the location data including specific fields, values, and/or levels of granularity. For instance, the content management server 112 may assign a specific score or a first ranking (e.g., "1") to the location data with the greatest level of granularity. For instance, first location data with a higher granularity (e.g., 121 W Main St Apt. 1, Juneau, WI, USA) may be ranked higher or receive a higher score than location data with a lower granularity (e.g., 121 W Main St., Juneau, WI, USA). In some embodiments, the content management server 112 may score the location data for each field or value of the location data schema that the location data includes. For instance, the location data schema may include 20 separate fields. Accordingly, for each field of the location data schema that each piece of location data includes, the content management server 112 may add a score of 1.

Likewise, location data which is complete (e.g., not missing any one of street address line or value, a locality line or value, or a country line or value) may be scored or ranked higher than location data that is not complete (e.g., is missing any one of street address line or value, a locality line or value, or a country line or value).

In some embodiments, the content management server 112 may score or rank the location data based on the location data matching the location data of a repository (e.g., the HCP repository 612). For instance, the content management server 112 may search the HCP repository 612 for HCP data including a location that matches the location data, and then rank the location data based on the respective match/no match. For instance, the content management server 112 may search or query the HCP repository 612 for a first address (e.g., 123 W Main St, Juneau, WI, USA) and a second address (e.g., 123 W Main St., Apt. 1, Juneau, WI, USA). Then, in response to returning HCP data that includes the first address, the content management server 112 may assign a first rank to the first location data including the first address (based on their being a match) and a second rank to the second location data including the second address (based on their being no match). In some embodiments, the content management server 112 may generate a request to an external repository (not shown) to determine whether the external repository includes a location matching each piece or set of location data. For instance, the external repository (not shown) may be the DEA HCP repository. The content management server 112 may then receive a response indicating whether the external repository includes matching pieces of location data.

In some embodiments, each piece or set of location data may include a last modified date, and the content management server 112 may rank or score the pieces of location data based on the last modified date. For instance, pieces of location data with a more recent last modified date may be ranked or scored higher than pieces of location data with an older last modified date.

In an illustrative example, the content management server 112 may receive a first or set piece of location data and then select a second and third piece of location data from the location data repository 610. The first piece of location data may include a first address (e.g., 2100 W Mill Rd, Juneau, WI, 53039, USA) and 19 of 20 location data schema fields; the second piece of location data may include a second address (e.g., 2100 W Mill Rd, Apt. 1, Juneau, WI, 53039, USA) and 20 of 20 location data schema fields; and the third piece of location data may include a third address (e.g., 2100 W Mill Rd, Juneau, USA) and 10 of 20 location data schema fields.

Likewise, the HCP repository 612 may include HCP data including the first address (e.g., 2100 W Mill Rd, Juneau, WI, 53039, USA). Accordingly, at step 720, the content management server 112 may determine or assign a score of 39 to the first piece of location data (one point for each location data schema field and 20 points for matching the HCP data of the HCP repository 610), a score of 30 to the second piece of location data (one point for each location data schema field and 10 points for having a full set of location data), and a score of 10 to the third piece of location data (one point for each location data schema field). The content management server 112 may then assign a first or highest rank to the first piece of location data (e.g., for having the largest score), a second rank to the second piece of location data (e.g., for having the second largest score), and a third or lowest rank to the third piece of location data (e.g., for having the lowest score).

In another illustrative example, the content management server 112 may receive a first piece or set of location data and then select a second and third piece of location data from the location data repository 610. The first piece of location data may include a first address (e.g., 2100 W Mill Rd, Juneau, WI, 53039, USA) and 19 of 20 location data schema fields; the second piece of location data may include a second address (e.g., 2100 W Mill Rd, Apt. 1, Juneau, WI, 53039, USA) and 20 of 20 location data schema fields; and the third piece of location data may include a third address (e.g., 2100 W Mill Rd, Juneau, USA) and 10 of 20 location data schema fields. Likewise, the HCP repository 612 may include HCP data including the first address (e.g., 2100 W Mill Rd, Juneau, WI, 53039, USA). Accordingly, at step 720, the content management server 112 may assign a highest or first rank to the first piece of location data (for matching the HCP data of the HCP repository 610) and a second or lowest rank to the second piece of location data and the third piece of location data (for not matching the HCP data of the HCP repository 610).

In this regard, in some embodiments, the content management server 112 may score the location data (e.g., based on their fields and matches), and then rank the pieces of location data based on their score. In other embodiments, the content management server 112 may directly rank the location data (e.g., based on one of the pieces or sets of location data matching the HCP data of the HCP repository 610, based on one of the pieces of location data having a full set of location data, etc.).

Once the content management server 112 has ranked the location data, the method 700 proceeds to step 724 at which the content management servers merges two or more pieces or sets of location data. For instance, at step 724, the content management server 112 may merge the two lowest ranked pieces or sets of location data. In some embodiments, the content management server 112 may merge the pieces of location data by combining or merging the fields of each piece of location data. For instance, a first piece of location data may include 10 fields and a second piece of location data may include 19 fields. Accordingly, the combined or merged piece of location data may include multiple fields selected from the 10 fields of the first piece of location data and the 19 fields of the second piece of location data. If only one piece of location data has a specific field, the combined piece of location data may include that specific field. In comparison, if each piece of location data includes the specific field (e.g., both the first piece of location data and the second piece of location data include an HCP NPI), the combined piece of location data may include the specific field of the higher-ranked piece of location data.

For example, the first location data may include 10 fields and second location data may include 19 fields, where all 10 fields overlap between each piece of location data (referred to herein as "common fields" (i.e., fields that are common to both pieces of location data). Further, the first location data may be ranked higher than the second location data. Accordingly, the content management server 112 may merge the pieces of location data to generate merged or combined location data. The combined location data may include the 10 fields of the first location data and the 9 fields of the second location data, that did not overlap with the first location data.

In some embodiments, steps 720 and/or 724 may be repeated until a single piece or set of combined location data remains. For instance, the content management server 112 may receive a first piece of location data and then select four pieces of location data at step 716. The content management server 112 may then rank the pieces and combine the two lowest ranked pieces of location data. The content management server 112 may then re-rank the (now) four pieces of location data at step 720 and combine the two lowest ranked pieces of location data at step 724. This process may be repeated until only a single piece of merged location data results.

In some embodiments, the content management server 112 may not repeat step 720 (and re-rank the pieces of location data), but may repeat step 724 until only a single piece of location data results. In this regard, the generated merged piece of location data may be considered the lowest ranked piece of location data in each merge.

Once the content management server 112 has merged the pieces of location data to generate the combined piece of location data, the method 700 proceeds to step 728 at which the content management server 112 stores the merged location data in the location data repository 610. In some embodiments, the location data selected at step 716 may be removed or deleted from the location data repository 610 and replaced with the merged location data. In other embodiments, the selected location data may be versioned (e.g., a version field may be accrued or increased), and the merged location data may be stored as the new version of the piece(s) of location data.

In some embodiments, after step 728, the merged location data may be selected (e.g., from the location data repository 610) or output to one of the content repositories 111a-111n and stored in an HCP or health care organization (HCO) data record. The data record may include one or more HCP identifier fields (e.g., national provider identifier (NPI)), one or more address field(s), one or more associated medical product fields, and the like. The HCP data record may be utilized by the marketing and sales application 216. For instance, the data record may be used in the development, approval, distribution, expiration and withdrawal of promotional materials. In another example, the data record may be used to populate Form FDA 2253 (or similar international forms).

As used herein, the term "engine", "application," "controller" "portal" or "app" may include hardware configured to execute the functions described herein. In some embodiments, each respective "engine", "application," "controller" "portal" or "app" may include machine-readable media for configuring the hardware to execute the functions described herein. The "engine", "application," "controller" "portal" or "app" may be embodied as one or more circuitry components including, but not limited to, processing circuitry, network interfaces, peripheral devices, input devices, output devices, sensors, etc. In some embodiments, the "engine", "application," "controller" "portal" or "app" may take the form of one or more analog circuits, electronic circuits (e.g., integrated circuits (IC), discrete circuits, system on a chip (SOC) circuits), telecommunication circuits, hybrid circuits, and any other type of circuit. In this regard, the "engine", "application," "controller" "portal" or "app" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "engine", "application," "controller" "portal" or "app" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components configured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, each of the "engine", "application," "controller" "portal" or "app" as described herein may include components that are distributed across one or more locations. Further, each may be distributed across one or more locations (e.g., each as part of one or more remote servers).

It should also be noted that the term "input device," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for generating location data, the method comprising:

receiving, by a content management server, first location data;

outputting, by the content management server, the first location data;

receiving, by the content management server and in response to outputting the first location data, a response;

validating, by the content management server, the first location data based on the response;

cleaning, by the content management server and in response to validating the first location data, the first location data; wherein the first location data includes a first field including a 3-digit zip code, and wherein the method further comprises: determining, by the content management server, a 9-digit zip code based at least partially on the cleaned first location data; and modifying, by the content management server, the first field of the cleaned first location data to include the 9-digit zip code querying, by the content management server, a first repository to select second location data and third location data;

assigning, by the content management server, the cleaned first location data a first rank, the second location data a second rank, and the third location data a third rank;

merging, by the content management server and based on the first rank and the second rank, the cleaned first location data and the second location data to generate first merged location data;

merging, by the content management server and based on the third rank, the first merged location data and the third location data to generate second merged location data; and storing, by the content management server, the second merged location data in the first repository.

2. The method of claim 1, wherein the first location data includes a first field and a second field, and wherein cleaning the first location data comprises:

removing, by the content management server, the second field of the first location data.

3. The method of claim 1, wherein the first location data includes an address field including a street type value, and wherein cleaning the first location data comprises:

modifying, by the content management server, the street type value to standardize the street address value.

4. The method of claim 1, wherein the first rank is a lowest rank, wherein the second rank is an intermediate rank, and wherein the third rank is a highest rank, further comprising:

determining, by the content management system, a first score based on the first location data;

determining, by the content management system, a second score based on the second location data; and determining, by the content management system, a third score based on the third location data, wherein the third location data is assigned the highest rank based on the third score being higher than the second score and the first score, wherein the second location data is assigned the intermediate rank based on the second score being higher than the first score, and wherein the first location data is assigned the lowest rank based on the first score being lower than the second score and the third score.

5. The method of claim 4, wherein the cleaned first piece of location data and the second piece of location data each include at least one common field, and wherein the first merged piece of location data includes the common field of the second piece of location data in response to the second piece of location data being ranked as the second rank.

6. The method of claim 5, wherein the third location data includes an address field including an address, wherein the third location data includes a health care provider (HCP) field including an HCP identifier, and wherein determining the third score comprises:

querying, by the content management server, a second repository for the HCP identifier to select HCP data including the HCP identifier and an address;

determining, by the content management server, the address of the third location data matches the address of the HCP data; and determining, by the content management server, the third score based at least partially on determining the address of the third location data matches the address of the HCP data.

7. A method for generating location data, the method comprising:

receiving, by a content management server, location data including an address field;

determining, by the content management server, the address field includes an address including a street address value, a locality value, and a country value;

validating, by the content management server, the first location data in response to determining the address of the address field includes the street address value, the locality value, and the country value;

cleaning, by the content management server and in response to validating the first location data, the first location data; wherein the address of the address field further includes a 3-digit zip code, and wherein the method further comprises: determining, by the content management server, a 9-digit zip code based at least partially on the cleaned first location data; and modifying, by the content management server, the address of the address field of the cleaned first location data to include the 9-digit zip code querying, by the content management server, a first repository to select second location data and a third location data;

assigning, by the content management server, the cleaned first location data a first rank, the second location data a second rank, and the third location data a third rank;

merging, by the content management server and based on the first rank and the second rank, the cleaned first location data and the second location data to generate first merged location data;

merging, by the content management server and based on the third rank, the first merged location data and the third location data to generate second merged location data; and storing, by the content management server, the second merged location data in the first repository.

8. The method of claim 7, wherein the first location data includes the address field and a second field, and wherein cleaning the first location data comprises:

removing, by the content management server, the second field of the first location data.

9. The method of claim 7, wherein the address of the address field further includes a street type value, and wherein cleaning the first location data comprises:

modifying, by the content management server, the street type value to standardize the street address value.

10. The method of claim 7, wherein the first rank is a lowest rank, wherein the second rank is an intermediate rank, and wherein the third rank is a highest rank, further comprising:

determining, by the content management system, a first score based on the first location data;

determining, by the content management system, a second score based on the second location data; and determining, by the content management system, a third score based on the third location data, wherein the third location data is assigned the highest rank based on the third score being higher than the second score and the first score, wherein the second location data is assigned the middle rank based on the second score being higher than the first score, and wherein the first location data is assigned the lowest rank based on the first score being lower than the second score and the third score.

11. The method of claim 10, wherein the cleaned first location data and the second location data each include at least one common field, and wherein the first merged location data includes the common field of the second location data in response to the second location data being ranked as the second rank.

12. The method of claim 11, wherein the third location data includes an address field including an address, wherein the third location data includes a health care provider (HCP) field including an HCP identifier, and wherein determining the third score comprises:

querying, by the content management server, a second repository for the HCP identifier to select HCP data including the HCP identifier and an address;

determining, by the content management server, the address of the third location data matches the address of the HCP data; and determining, by the content management server, the third score based at least partially on determining the address of the third location data matches the address of the HCP data.

13. A method for generating location data, the method comprising:

receiving, by a content management server, first location data;

outputting, by the content management server, the first location data;

receiving, by the content management server and in response to outputting the first location data, a response;

validating, by the content management server, the first location data based on the response;

cleaning, by the content management server and in response to validating the first location data, the first location data; wherein the first location data includes a first field including a 3-digit zip code, and wherein the method further comprises: determining, by the content management server, a 9-digit zip code based at least partially on the cleaned first location data; and modifying, by the content management server, the first field of the cleaned first location data to include the 9-digit zip code querying, by the content management server, a first repository to select second location data and third location data;

assigning, by the content management server, the cleaned first location data a first rank, the second location data a second rank, and the third location data a third rank;

merging, by the content management server and based on the second rank and the third rank, the second location data and the third location data to generate first merged location data;

merging, by the content management server and based on the first rank, the first merged location data and the cleaned first location data to generate second merged location data; and storing, by the content management server, the second merged location data in the first repository.

14. The method of claim 13, wherein the first location data includes a first field and a second field, and wherein cleaning the first location data comprises:

removing, by the content management server, the second field of the first location data.

15. The method of claim 13, wherein the first location data includes an address field including a street type value, and wherein cleaning the first location data comprises:

modifying, by the content management server, the street type value to standardize the street address value.

16. The method of claim 13, wherein the third rank is a lowest rank, wherein the second rank is an intermediate rank, and wherein the first rank is a highest rank, further comprising:

determining, by the content management system, a first score based on the cleaned first location data;

determining, by the content management system, a second score based on the second location data; and determining, by the content management system, a third score based on the third location data, wherein the cleaned first location data is assigned the highest rank based on the first score being higher than the second score and the third score, wherein the second location data is assigned the middle rank based on the second score being higher than the third score, and wherein the third location data is assigned the lowest rank based on the third score being lower than the second score and the first score.

17. The method of claim 16, wherein the cleaned first location data includes an address field including an address, wherein the cleaned first location data includes a health care provider (HCP) field including an HCP identifier, and wherein determining the first score comprises:

querying, by the content management server, a second repository for the HCP identifier to select HCP data including the HCP identifier and an address;

determining, by the content management server, the address of the third location data matches the address of the HCP data; and determining, by the content management server, the first score based at least partially on determining the address of the cleaned first location data matches the address of the HCP data.

* * * * *